US008561261B2

(12) United States Patent
Gibson

(10) Patent No.: US 8,561,261 B2
(45) Date of Patent: Oct. 22, 2013

(54) NEEDLE BEARING HINGE ASSEMBLY

(76) Inventor: Thomas Gibson, Knoxville, TN (US)

( * ) Notice: Subject to any disclaimer, the term of this patent is extended or adjusted under 35 U.S.C. 154(b) by 0 days.

(21) Appl. No.: 13/476,053

(22) Filed: May 21, 2012

(65) Prior Publication Data

US 2012/0291223 A1   Nov. 22, 2012

Related U.S. Application Data

(60) Provisional application No. 61/487,983, filed on May 19, 2011.

(51) Int. Cl.
  *E05D 11/02*   (2006.01)
(52) U.S. Cl.
  USPC .................... 16/274; 16/275; 16/276; 16/386
(58) Field of Classification Search
  USPC .................... 16/273–276, 386; 403/164, 165; 384/618, 622, 623
  See application file for complete search history.

(56) References Cited

U.S. PATENT DOCUMENTS

| | | | | | |
|---|---|---|---|---|---|
| 1,433,095 | A | * | 10/1922 | Peary | 16/274 |
| 1,848,427 | A | * | 3/1932 | Leister | 16/276 |
| 1,898,936 | A | * | 2/1933 | Brawley | 16/274 |
| 2,053,684 | A |  | 9/1936 | Cook | |
| 2,077,844 | A | * | 4/1937 | Leighton | 403/157 |
| 2,205,786 | A |  | 6/1940 | Bernhard | |
| 2,285,870 | A | * | 6/1942 | Parker | 474/91 |
| 2,531,326 | A | * | 11/1950 | Di Paolo et al. | 403/36 |
| 3,006,703 | A | * | 10/1961 | Bensch | 384/564 |
| 3,046,064 | A | * | 7/1962 | Schaeffler | 384/572 |
| 3,316,037 | A | * | 4/1967 | Schaeffler | 384/448 |
| 3,435,705 | A | * | 4/1969 | Walton | 74/640 |
| 3,605,339 | A |  | 9/1971 | Catlett | |
| 5,551,794 | A | * | 9/1996 | Aarre et al. | 403/374.4 |
| 5,771,538 | A |  | 6/1998 | Huppert | |
| 6,042,295 | A | * | 3/2000 | Barden | 403/158 |
| 6,149,222 | A |  | 11/2000 | Schambre | |
| 6,481,056 | B1 |  | 11/2002 | Jesse | |
| 6,514,002 | B1 | * | 2/2003 | Katae et al. | 403/150 |
| 7,703,577 | B1 |  | 4/2010 | Zach | |

FOREIGN PATENT DOCUMENTS

| | | | |
|---|---|---|---|
| CN | 201099281 Y | * | 8/2008 |
| KR | 2009063651 A | * | 6/2009 |

* cited by examiner

*Primary Examiner* — Chuck Mah
(74) *Attorney, Agent, or Firm* — Daniel Boudwin

(57) ABSTRACT

Disclosed is an enclosed needle bearing hinge mechanism having externally rotatable race surfaces, internal needle bearings, an internal pathway for introducing grease into the assembly for improved lubrication, reduced wear and a construction adapted to support large door or latch loads. The assembly comprises a housing having at least one needle bearing in contact with an outer rotating race, stationary or counter-rotating interior races, a central pin shaft and an internal pathway for lubrication to be communicated from a topmost grease fitting to the contact interface between the needle bearing and outer rotating race. One or plurality of needle bearing assemblies and counter-rotating outer races may be present within the assembly, each with an independent grease pathway branch. The pathway comprises a hollow internal conduit that allows lubricant to contact each needle bearing in the assembly, reducing friction and improving longevity of the hinge bearing assembly.

4 Claims, 2 Drawing Sheets

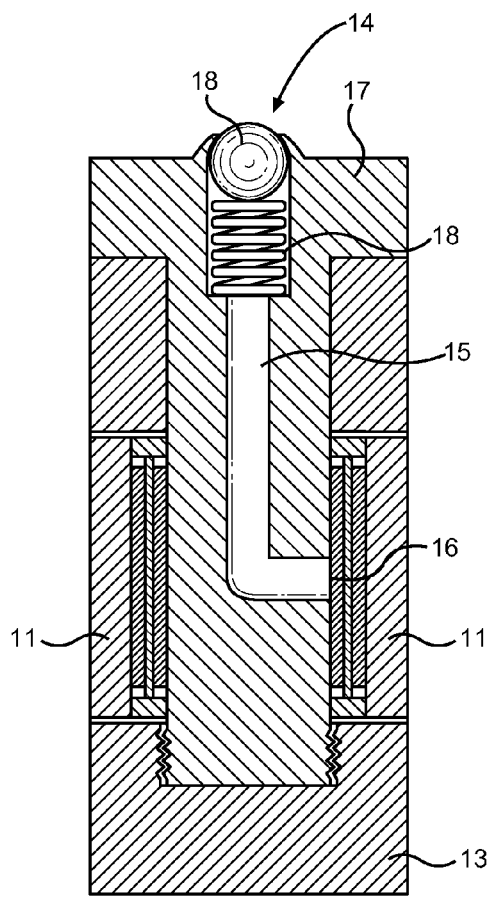
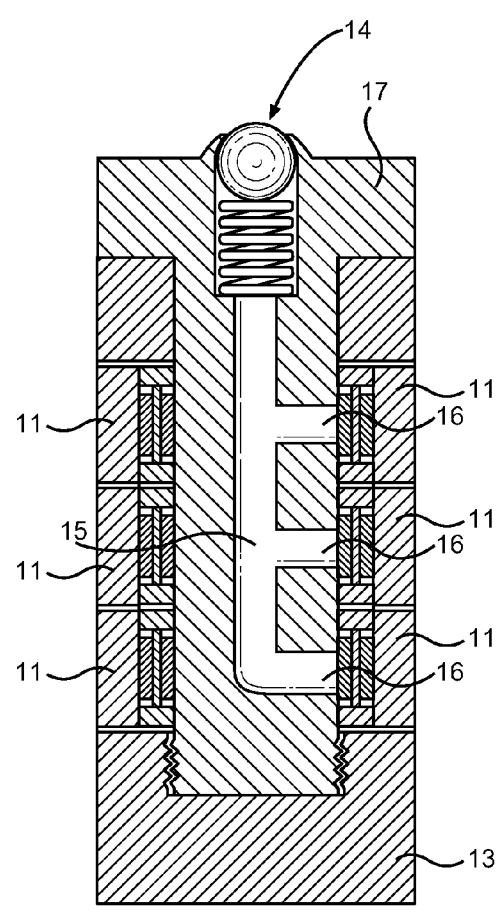
FIG. 2  FIG. 3

NEEDLE BEARING HINGE ASSEMBLY

CROSS REFERENCE TO RELATED APPLICATION

This application claims the benefit of U.S. Provisional Application No. 61/487,983 filed on May 19, 2011, entitled "Needle Bearing Hinges." The patent application identified above is incorporated here by reference in its entirety to provide continuity of disclosure.

BACKGROUND OF THE INVENTION

1. Field of the Invention

The present invention relates to rotating door and hinge mechanisms. More specifically, the present invention relates to a hinge bearing assembly having improved construction that facilitates improved lubrication, reduced wear and improved operating of a hinge joint. The construction of the device includes at least one needle bearing assembly, wherein the needle bearings offer improved free rotation of the hinge joint over metal-to-metal non-rotating surfaces and simple pin hinge mechanisms. The assembly further incorporates an ability to easily grease the bearings while installed, further reducing friction, squeaking and wear over its operational life.

Needle roller bearings are a type of bearing that utilizes cylindrical members that act as a continuous bearing surface at a rotating joint interface. The large surface area of the roller bearings and reduced clearances between the rollers and a contact interface allow the needle bearings to support higher loads over larger distances, as compared to ball bearing assemblies. The present invention contemplates the use of a needle bearing joint in a door or similar rotating hinge, wherein the hinge comprises a unique design that facilitates lubrication and ease of maintenance of the hinge while in operation.

2. Description of the Prior Art

Several devices have been described in the prior art that relate to needle bearings and hinge pins having lubrication means. These include patented devices and those disclosed in patent application publications. These devices do not describe the assembly and construction of the present invention, and fail to contemplate its intended use and application. The devices deemed most relevant to the present disclosure are herein summarized for the purpose of highlighting their inherent differences and differentiating the elements of the present invention.

Specifically, U.S. Pat. No. 6,481,056 to Jesse discloses a door checking apparatus for an automobile hinge that comprises a plurality of needle bearings in contact with a bearing surface having grooves axially oriented with respect to the needle bearings. Imparted rotary motion causes the needle bearing to move relative to the bearing surface as the needle bearings move in and out of the grooves. The device of Jesse provides a door checking device for an automotive application that reduces weight, cost and packaging space required, wherein the assembly allows a door to be held in a given position based on the needle bearing placement within the grooves of the device. While providing an assembly that offers needle bearings in a door hinge application, the Jesse device offers no means of inserting lubricating grease or oil into the bearing assembly after the device is deployed. The present invention comprises a needle bearing assembly having an internal conduit for inserting such lubrication for reducing friction, ease of operation and improving the useful life of the hinge.

U.S. Pat. No. 7,703,577 to Zach discloses a door hinge lubricator in combination with a door hinge, which comprises door hinge having hinge plates, a tube, and a wicking material. At least one lubrication opening is formed through a wall of the tube. The wicking material is inserted into the tube and communicated through the lubrication openings to lubricate the door hinge. Similar to the Zach disclosure is U.S. Pat. No. 5,771,538 to Huppert, which discloses a lubricated hinge pin having a hollow cylindrical body having a grease reservoir and a plurality of ports through which the grease may flow into an attached hinge joint. A grease fitting is provided at the top of the device to allow insertion of the grease thereinto. Further still, U.S. Pat. No. 2,053,864 to Cook discloses a hinge having a similar lubrication pathway and ports for communicating the lubricant into a hinge mechanism.

The Zach, Huppert and Cook disclosures are limited to hinge pins that offer a pathway to lubricate a hinge joint. These devices are well adapted to provide a lubrication pathway in simple door hinges, wherein a central pin is utilized to support two hinge plates in relative motion with one another. However, these devices do not disclose an enclosed needle bearing assembly that offers improved freedom of rotation, improved lubrication and increased load capacity over simple hinge pins. The present invention relates to door hinge assembly having improved operation that prevents wear, squeaking and improved free motion of the hinge joint during its operation. The assembly is insertable within hinge point locations and capable of support considerable door and latch loads over a simple pin structure. Overall, the present invention substantially diverges in design elements from the prior art, and consequently it is clear that there is a need in the art for an improvement to existing hinge bearing devices. In this regard the instant invention substantially fulfills these needs.

SUMMARY OF THE INVENTION

In view of the foregoing disadvantages inherent in the known types of hinge bearing devices now present in the prior art, the present invention provides a new hinge assembly wherein the same can be utilized for providing convenience for the user when supporting higher hinge loads, reducing wear over long-term hinge installations and improving operation thereof.

It is therefore an object of the present invention to provide a new and improved hinge bearing device that has all of the advantages of the prior art and none of the disadvantages.

It is another object of the present invention to provide a needle bearing hinge assembly that offers improved operation, useful life and load capacity of the hinge over existing hinge pin assemblies.

Another object of the present invention is to provide a needle bearing hinge assembly having internal needle bearings, a pathway for inserting grease through the assembly and to the bearings, and a grease fitting for easy access to the pathway after installation of the hinge assembly.

Yet another object of the present invention is to provide a needle bearing hinge device that is provided in an enclosed and removable assembly, wherein the assembly is insertable into the hinge in place of a simple pin bearing surface to improve free rotation and operation of the hinge.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 2 shows a cross section view of a single needle bearing variant of the present invention.

FIG. 3 shows a cross section view of a three needle bearing variant of the present invention.

DETAILED DESCRIPTION OF THE INVENTION

Figure 1:
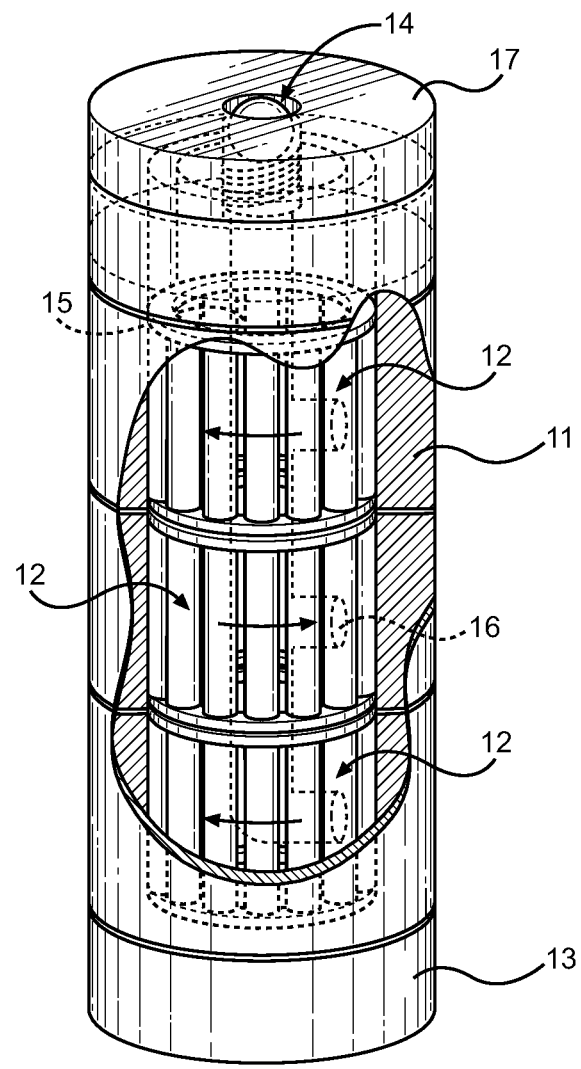
FIG. 1 shows a perspective view of the present invention, including a view of the needle bearing assemblies within the device.

Reference is made herein to the attached drawings. Like reference numerals are used throughout the drawings to depict like or similar elements of the hinge bearing device. For the purposes of presenting a brief and clear description of the present invention, the preferred embodiment will be discussed as used for replacement of a hinge pivot pin with one that incorporates needle bearings and a means of lubricating the assembly during operation. The figures are intended for representative purposes only and should not be considered to be limiting in any respect.

Referring now to FIG. 1, there is shown a frontal perspective view of a needle bearing assembly as described by the present invention, wherein a cut-away window shows its internal structure. The assembly comprises at least one needle bearing 12, an outer rotating surface 11 and an internal lubrication conduit 15. As shown in FIG. 1, the assembly comprises three needle bearings 12 and three independently rotating surfaces 11, which allows three independent pivot surfaces. A central shaft aligned through the length of the assembly acts as a central pin about which the needle bearings rotate, wherein the shaft comprises an interior conduit 15 that forms a lubrication pathway to each needle bearing 12 in the device. At the topmost portion of the shaft is an end cap 17 and grease fitting 14, wherein the grease fitting 14 allows grease to be entered into the conduit 15 via a grease gun, which supplies fluid pressure to a captive ball bearing that secures the entrance of the conduit closed via a retaining spring. As grease is supplied through the fitting 14, it travels through the conduit 15 within the central shaft and to independent branches 16 in the conduit, supplying grease directly to the contact interface between the shaft and the rotating needle bearings. As the needle bearings rotate, grease is applied along the entire needle bearing surface and to the outer rotating surface contact interface, reducing friction and improving smooth contact therebetween.

The assembly is adapted to be inserted into a door hinge, and in particular a hinge that supports particularly heavy loads and is prone to causing simple pin joints and barrel joints to become quickly worn. The use of internal needle bearings 12 and an enclosed assembly that allows for ready lubrication reduces wear, longevity of the joint and eliminates squeaking as the joint is rotated through its range of motion. In its simplest form, a single need bearing 12 and outer rotating surface 11 are present, wherein the outer surface 11 contacts the internal barrel surface of a hinge joint while the top end cap 17 and bottom end cap 13 are supported, allowing relative rotation of the outer surface 11 about the central shaft. Loads from the hinge barrel surface are imparted onto the rotating outer surface 11, which bears into the needle bearing 12. The needle bearing 12 itself is an assembly that comprises a plurality of aligned cylindrical rollers that are centrally and rotatably supported in a radial pattern about the central shaft. The length of each roller and thus its larger surface area spreads loads to improve load capacity for larger hinge joint compatibility, while the lubrication conduit to each needle bearing 12 further reduces friction and wear during use.

Referring now to FIGS. 2 and 3, there are shown cross section views of two embodiments of the needle bearing hinge assembly of the present invention. Each embodiment comprises at least one radial needle bearing, an outer rotating surface 11 and a central shaft having a lubrication pathway or conduit 15. The central shaft spans between an uppermost 17 and lower end cap 13, and supports the needle bearing along its length. The conduit 15 is sealed by a captive ball 18 and spring grease fitting 14, which allows grease to be inserted through the conduit 15 via depression of the spring. Grease flows from the fitting 14 and into the branches 16 of the conduit to supply lubrication to each needle bearing within the assembly. The number of rotating outer surfaces 11 and needle bearings are dependent on the design of the particular joint the hinge assembly is being inserted into and the particular application.

Conventional door hinges and door pivot hinges can become quite worn over time. Larger doors and latches can be particularly heavy, placing high loads onto the supporting structure and hinges that allow for free rotation of the assembly. As the door rotates about the hinge, the weight on the hinge bearing surfaces creates internal friction, causing the hinge to grind, wear and possibly squeak. This can also be true for lighter doors that are used on a regular basis and are worn through excessive and repeated use rather than a particularly high load level. As hinges succumb to excessive wear, they may start to squeal or fail, causing the doors to drag, become misaligned or cease to function as designed. This can be dangerous and may necessitate frequent hinge replacements, which is inconvenient, expensive and time consuming.

The present invention is therefore submitted as a new and improved door hinge insert, which is adapted to replace a simple barrel hinge joint and provide one having internally rotatable needle bearings and a means to lubricate the assembly. The needle bearings reduce wear by transferring the bearing forces, and thus the applied hinge friction, into needle roller rotation. Contact interfaces are further lubricated via an internal conduit that allows a user to insert grease or appropriate lubrication directly through the assembly and to the contact interfaces at each needle roller. This eliminates the need for continual maintenance, wherein the needle bearings assembly must be disassembled for services and lubrication, as the assembly can be lubricated while in a working position at regular intervals. Regular lubrication improves the longevity of the hinge and reduces the interval with which such hinges require replacement or inspection.

The construction of the assembly is adapted to be one that is not readily disassemblable, but rather supplied as a replaceable unit, wherein the unit includes rotatable outer surfaces, a central shaft about which needle bearings allow relative motion between the shaft and the outer surfaces. A plurality of needle bearings may be aligned on the shaft, wherein each bearing provides independent rotation of an outer surface. A first and second end cap secure the needle bearings and rotating outer surfaces along the shaft, while the central lubrication conduit allows for grease or other lubricant to be easily inserted into the interior contact interfaces of the assembly while deployed. A grease fitting on a first end cap, or on both end caps, provide an entrance to the grease pathway, wherein a grease gun or pressurized lubricant is well adapted to inject a lubricating fluid into the central shaft and towards branches in the pathway that lead to the needle rollers. This can greatly reduce friction as the needle bearing rotates around the central shaft when doors are being opened and closed. The device can be applied to existing designs or new assemblies, especially for heavy door applications and in particular automotive door hinges.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A needle bearing hinge assembly, comprising:
   a cylindrical assembly having at least one freely rotating outer surface;
   at least one radial needle bearing supporting and concentrically enclosed within said cylindrical assembly;
   said needle bearing mounted about a central shaft having a first end cap, and second end cap, said end caps securing said at least one rotating outer surface and needle roller bearing therebetween and along said shaft, wherein said first and second end caps are positioned at opposing ends of said rotating outer surface and said central shaft, and each of said end caps has an outer surface in linear alignment with said rotating outer surface;
   said needle bearings allowing relative rotation between said outer rotating surface and said central shaft;
   said central shaft having a lubrication conduit therethrough leading from a grease fitting on said first end cap, said conduit branching radially towards each of said needle roller bearing for communicating lubricant from said grease fitting to said roller bearing, and wherein said conduit does not extend through said rotating outer surface.

2. The device of claim 1, wherein said grease fitting further comprises a captive ball and spring securing an upper opening of said lubrication conduit.

3. The device of claim 1, wherein said central shaft is removably connecting to said second end cap.

4. The device of claim 1, wherein said second end cap has a grease fitting communicating with said lubrication conduit.

* * * * *